US010037203B1

(12) United States Patent
Chavez et al.

(10) Patent No.: US 10,037,203 B1
(45) Date of Patent: Jul. 31, 2018

(54) REAL-TIME SOFTWARE UPGRADE

(71) Applicant: National Technology & Engineering Solutions of Sandia, LLC, Albuquerque, NM (US)

(72) Inventors: Adrian R. Chavez, Davis, CA (US); Kandy Phan, Albuquerque, NM (US); Jasenko Hosic, Seattle, WA (US); Ryan Michael Birmingham, Albuquerque, NM (US); Jaykumar D. Patel, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 50 days.

(21) Appl. No.: 15/221,843

(22) Filed: Jul. 28, 2016

(51) Int. Cl.
*G06F 9/44* (2018.01)
*G06F 8/65* (2018.01)

(52) U.S. Cl.
CPC .................... *G06F 8/65* (2013.01)

(58) Field of Classification Search
None
See application file for complete search history.

(56) References Cited

U.S. PATENT DOCUMENTS

| | | | | |
|---|---|---|---|---|
| 6,308,319 | B1* | 10/2001 | Bush | G06F 8/458 707/999.202 |
| 6,463,584 | B1* | 10/2002 | Gard | G06F 8/67 370/396 |
| 7,251,812 | B1 | 7/2007 | Jhanwar et al. | |
| 8,364,843 | B2* | 1/2013 | Hanselmann | G06F 8/67 709/223 |
| 8,381,203 | B1* | 2/2013 | Beylin | G06F 8/458 717/149 |
| 2005/0216904 | A1* | 9/2005 | Needham | G06F 8/67 717/168 |

(Continued)

OTHER PUBLICATIONS

Hayden, et al., "State Transfer for Clear and Efficient Runtime Updates", In IEEE 27th International Conference on Data Engineering Workshops, 2011, 6 pages.

(Continued)

*Primary Examiner* — Insun Kang
(74) *Attorney, Agent, or Firm* — Medley, Behrens & Lewis, LLC

(57) ABSTRACT

The various technologies presented herein relate to upgrading industrial control software in real-time. During utilization of a first software to control an industrial process, a determination can be made that the first software needs to be replaced (e.g., partially or entirely) owing to a newer version of software is ready to be deployed, a vulnerability in the first software has been determined, etc. Rather than closing the industrial process down while the first software is replaced, a second software can be deployed such that the first software and the second software are operating in parallel (e.g., receiving the same operational data, process states). When a critical point (upgrade location) in the first software has been reached, control of the industrial process can be switched to the second software, thereby enabling control of the industrial process to occur without having to temporarily cease operation and/or monitoring of the industrial process.

12 Claims, 8 Drawing Sheets

(56) References Cited

U.S. PATENT DOCUMENTS

| | | | | |
|---|---|---|---|---|
| 2006/0184714 | A1* | 8/2006 | Dang | G06F 8/65 |
| | | | | 711/100 |
| 2007/0055970 | A1* | 3/2007 | Sakuda | G06F 8/65 |
| | | | | 717/168 |
| 2008/0256528 | A1* | 10/2008 | Waitzmann | G06F 8/67 |
| | | | | 717/172 |
| 2009/0144712 | A1* | 6/2009 | Steensgaard | G06F 8/4441 |
| | | | | 717/154 |
| 2009/0150872 | A1* | 6/2009 | Russell | G06F 8/67 |
| | | | | 717/140 |
| 2010/0192139 | A1* | 7/2010 | Titzer | G06F 9/485 |
| | | | | 717/151 |
| 2011/0145807 | A1* | 6/2011 | Molinie | G06F 8/65 |
| | | | | 717/170 |
| 2012/0110562 | A1* | 5/2012 | Heinrich | G06F 8/65 |
| | | | | 717/169 |
| 2012/0198432 | A1* | 8/2012 | Arakawa | G06F 8/65 |
| | | | | 717/169 |
| 2013/0283252 | A1* | 10/2013 | Mannarswamy | G06F 8/65 |
| | | | | 717/168 |
| 2014/0059530 | A1* | 2/2014 | Banavalikar | G06F 9/4406 |
| | | | | 717/170 |
| 2016/0019044 | A1* | 1/2016 | Stolarchuk | G06F 8/65 |
| | | | | 717/171 |
| 2017/0109156 | A1* | 4/2017 | Hong | G06F 8/67 |

OTHER PUBLICATIONS

Hayden, et al., "Kitsune: Efficient, General-purpose Dynamic Software Updating for C", In ACM SIGPLAN Notices, vol. 47, No. 10, 2012, 16 pages.

Makris, et al., "Immediate Multi-Threaded Dynamic Software Updates Using Stack Reconstruction", In USENIX Annual Technical Conference, vol. 2009, 2009, pp. 1-14.

Miedes, et al., "Dynamic Software Update", Technical Report 1TI-SIDI-2012/04, May 21, 2012, 31 pages.

Neamtiu, et al., "Contextual Effects for Version-Consistent Dynamic Software Updating and Safe Concurrent Programming", In POPL 2008, Jan. 7, 2007, 13 pages.

Wahler, et al., "Dynamic Software Updates for Real-Time Systems", In HotSWUp, Oct. 25, 2009, 6 pages.

Lee, Insup, "DYMOS: A Dynamic Modification System", 1983, 163 pages.

* cited by examiner

REAL-TIME SOFTWARE UPGRADE

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Computer systems have found numerous applications in the industrial automation environment and are employed ubiquitously throughout, e.g., to control and/or monitor the operation of an industrial process, machine, tool, device, and the like. To facilitate control of a process, etc., one or more controllers (e.g., a programmable logic controller (PLC)) are utilized with input/output (I/O) devices controlling operation of the process along with gathering process information (e.g., measurements, data, values, parameters, variables, metadata) pertaining to how the process is performing.

During operation of an industrial process, oftentimes software applications being utilized to control and/or monitor one or more machines, devices, etc., included in the industrial process will have to be replaced (e.g., partially or entirely) owing to a newer version of software being ready to be deployed, a software vulnerability has been detected, etc. Typically, updating an initial software with a newer version requires the one or more devices associated with the software (e.g., a PLC having the initial software installed thereon) to be taken "off-line", which can cause unwanted disruption (e.g., downtime) of the industrial process operation, e.g., in a high consequence environment. The downtime can be lengthy as the whole industrial process may have to be shut down and subsequently restarted, with inherent cost and possible technical issues (e.g., having the industrial process return to an optimum operating state). Hence, with a conventional approach to software upgrade, a situation can arise where the software has been identified as being vulnerable to attack, but a software patch cannot be applied in a timely manner owing to a high availability requirement for the industrial process. By way of illustration, an energy producing process may be unable to be taken offline even though a vulnerability to the software exists, and rather, installation of a software patch may be postponed until a planned outage occurs (e.g., quarterly, annual, biannual scheduled maintenance).

SUMMARY

The following is a brief summary of subject matter that is described in greater detail herein. This summary is not intended to be limiting as to the scope of the claims.

Various exemplary embodiments presented herein relate to upgrading industrial control software in real-time while a controlled device remains online. During utilization of a first software to control an industrial process, a determination can be made that it is desirable that the first software be replaced (e.g., partially or entirely) owing to a newer version of software being ready to be deployed, detection of a vulnerability in the first software, etc. Rather than closing the industrial process down while the first software is replaced, a second software can be deployed such that the first software and the second software are operating in parallel (e.g., synchronized to receive the same operational data, process states).

During the parallel operation, the operational data, etc., can be provided to both the first software and the second software. The first software is still controlling operation of the industrial process while the second software can be mirroring the operations being performed by the first software, such that the second software is operating in lock step with the first software. When a critical point (upgrade location, upgrade point) in the first software has been reached, control of the industrial process can be switched to the second software, thereby enabling control of the industrial process to switch to the newer software without having to temporarily cease operation and/or monitoring of the industrial process to update to the newer software. Hence, during an initial phase of operation, the first software is controlling the industrial operation, during an intermediate phase the first software is controlling the industrial operation and process data is also being provided to the second software, and during a final phase the first software ceases control of the industrial process and the second software assumes control of the industrial process.

In an embodiment, the first software can be operating on an industrial controller (e.g., a programmable logic controller (PLC)) that is in direct control of an industrial process. At a later time, the second software can be installed on the industrial controller, wherein a proxy component (e.g., hardware or software) enables operational data to be provided to both the first software and the second software. Subsequently, the second software assumes control of the industrial process.

In another embodiment, the first software can be operating on a first industrial controller (e.g., a first PLC) that is in direct control of an industrial process. In a pre-emptive approach, a proxy component can be between the first PLC and one or more devices included in the industrial process, such that data flows through the proxy component between the first PLC and the one or more devices. At a later time, a second industrial controller (e.g., a second PLC having a second software installed thereon) can be connected to the proxy component, thereby enabling the second PLC to receive the same process data that is being received at the first PLC. For a period of time, the first software/PLC and the second software/PLC can be processing the same data, while the first PLC retains control of the industrial process. When a critical point in the first software is reached, control of the industrial operation can switch to the second software.

In an embodiment, the first software can be replaced in its entirety by the second software (e.g., a complete software upgrade). In another embodiment, a determination can be made that only a portion of the first software has to be replaced/upgraded, and the second software can comprise the portion to patch the first software.

As previously mentioned, the first software (and accordingly the second software) can have one or more critical points identified therein. A critical point can be a software location where it is suitable for the first software to be replaced with the second software, wherein a critical point can be a point in the software where minimal, or no, software operations (e.g., read/write operations) are being performed.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
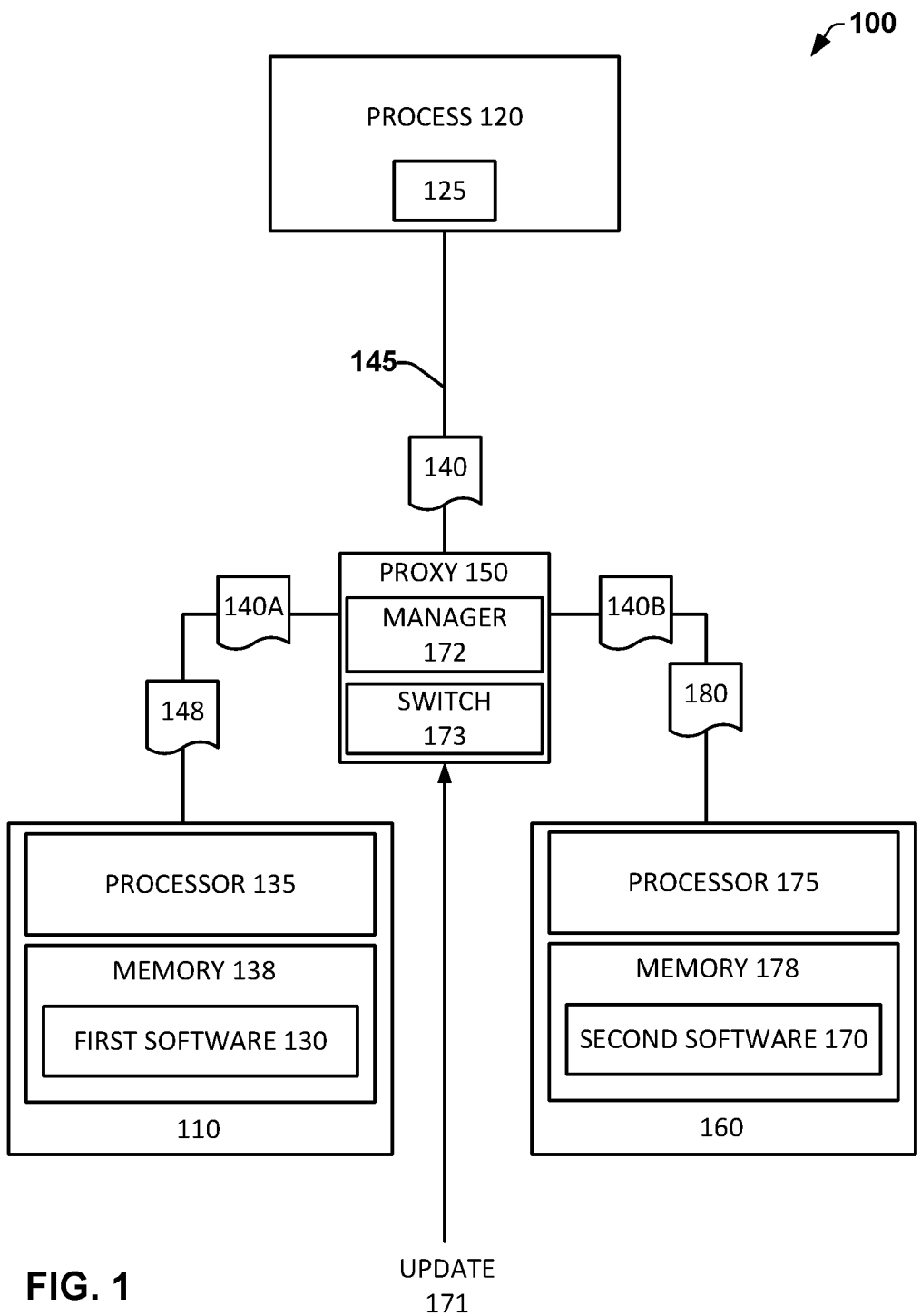
FIG. 1 presents an industrial control system for real-time software updating, according to an embodiment.

Various technologies pertaining to upgrading industrial control software in real-time are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

The following embodiments present systems and methods for replacing industrial control software in real-time, wherein, contrary to conventional approaches to upgrading software, the industrial process can continue to operate while the software is being upgraded, e.g., there is no downtime to the industrial process during software upgrade/patching. A first software (a first instance of software, a first software program, a first software instance) can be executing on a control device, whereupon a determination can be made that the first software is to be replaced, e.g., due to scheduled software maintenance, to correct a newly discovered vulnerability to the first software, to enhance performance of the industrial control software and the critical infrastructure associated therewith, or to improve security of the critical infrastructure. As further described herein, while the first software is still controlling the industrial process, a second software (a second instance of software, a second software program, a second software instance) can be installed to operate concurrently with the first software such that the second software is provided with the same operational data (e.g., measurements, data, values, parameters, variables, metadata) that is being received at the first software. Accordingly, operations being performed by the first software can be mirrored by the second software, wherein the second software can mirror the knowledge of the process that the first software has.

At a subsequent time, e.g., when the second software has obtained enough operational data for the second software to have sufficient knowledge of the industrial process (e.g., a desired portion of operations performed by the second software has executed), control of the industrial process can be transferred (dynamically updated, dynamically redirected, migrated) to the second software, with operational control by the first software being terminated. During transfer of control from the first software to the second software, transfer of internal state information of the first software to the second software can occur without any interruptions in communication(s) or software execution. The transfer of control from the first software to the second software, per the various embodiments herein, enables operation of an automated system capable of real-time software upgrading. Accordingly, with operational control being switched from the first software to the second software in real-time, operation of the industrial process is maintained without affecting any high availability constraint(s) applicable to the industrial process, where such industrial process can be power generation, a manufacturing process, operation of a dam or hydroelectric facility, a process associated with a utility, etc.

FIG. 1 presents an industrial control system (ICS) 100 configured to facilitate real-time software updating. As shown, the ICS 100 comprises a first controller 110 connected to one or more devices included in an industrial process 120. It is to be appreciated that while only a single device 125 is illustrated in the process 120, the process 120 can include a plurality of devices being controlled (and/or monitored) by the first controller 110.

The first controller 110 can be any suitable device or component configured to control the process 120, or a portion thereof. For example, the first controller 110 can be a programmable logic controller (PLC), a remote terminal unit (RTU), a programmable automation controller (PAC), an intelligent electrical device (IED), a human machine interface (HMI), or a smart general purpose computer (e.g., a smart personal computer/PC).

The device 125 can be any device associated with an operation controlled/monitored by the first controller 110. For example, in a non-exhaustive listing, the device 125 can be any of an I/O device, a controller, a sensor, an interface, a human machine interface (HMI), a graphical user interface (GUI), a device, a machine, a tool, or a motor, to facilitate performing at least one operation in the industrial automation environment.

The first controller 110 includes a processor 135 and memory 138. The memory 138 further includes a first software 130, which can be executed by the processor 135. Thus, the first software 130 is installed on the first controller 110. Operational data 140 can be received at the first controller 110 from the device 125 in the process 120 via a network 145, and further, an instruction(s) 148 (control data) can be generated by the first software 130 for implementation on the device 125. As further described, a proxy component 150 (e.g., a proxy server) can be located on the network 145 to facilitate transmission of data (e.g., data 140) and/or an instruction (e.g., instruction 148) between the device 125, the first controller 110, and any additional controllers that may be utilized to perform the real-time software update. Thus, during an initial operation ("initial phase"), the controller 110 is in communication with the device 125, via the network 145 and the proxy component 150.

At a subsequent time ("determination phase"), a determination can be made that the first software 130 requires an update or patch. The reasons for the first software 130 to be upgraded or patched are numerous, and are not limited by the following examples, such as a new upgrade to the first software 130 is ready to be installed, a vulnerability in the first software 130 has been identified and the first software 130 requires patching to remove the vulnerability, to enhance performance of operation of the device 125, or to improve security of the device 125.

As shown in FIG. 1, a second controller 160 can be connected to the network 145 (e.g., via the proxy component 150), wherein the second controller 160 has installed thereon a second software 170. The second software 170 can include an update/patch for the first software 130 (e.g., the second software 170 can be a partial clone of the first software 130). The second controller 160 further includes a second processor 175 and a second memory 178. The second memory 178 can include the second software 170, which can be executed by the second processor 175 to enable control of the device 125 (and accordingly, all or part of the process 120). As shown, the second software 170 can receive the operational data 140 from the device 125, and can further generate a second instruction 180 to facilitate control of the device 125.

An update signal 171 (instruction, command, request) can be received to facilitate execution of the second software 170 on the second controller 160, wherein the second software 170 and the first software 130 are executing in parallel (synchronized), termed herein "parallel phase". The update signal 171 can be received at an update manager component 172, wherein the update manager component 172 can be configured to initiate the switch from the first software 130 controlling the device 125 to the second software 170 taking over control of the device 125. FIG. 1 illustrates the upgrade manager component 172 being located in the proxy component 150, however, it is to be appreciated that the upgrade manager component 172 can be located in any suitable device, e.g., in the first controller 110 and/or the second controller 160.

During the parallel phase operation, the first software 130 is currently still controlling the device 125, e.g., with instruction 148, while the second software 170 receives the copy 140B of the operational data along with the instruction 148 generated by the first software 130. For example, a switch 173 in the proxy component 150 can be switched by the update manager component 172 from a first single state operation, where only the first controller 110 is in communication with the device 125, to a dual state operation, where the first controller 110 and the second controller 160 are in communication with the device 125 and each other, such that the second software 170 can concurrently receive both the copy of the operational data 140B and any instruction(s) 148 generated by the first software 130. By mirroring operation of the first software 130, the second software 170 can operate in lock step with the first software 130, such that the second software 170 has a same level of knowledge regarding operation of the device 125 as the first software 130 has. The parallel phase operation can continue for a duration after which the second software 170 has sufficient knowledge of the operation of the device 125 (and further, operation of the process 120) such that switching control of the device 125 from the first software 130 to the second software 170 is a seamless operation. In an embodiment, the memory 178 can include a database comprising a plurality of parameters associated with the device 125, and switching from the first software 130 to the second software 170 cannot occur until a value has been assigned for each parameter in the database, e.g., as obtained from the operational data 140B and/or the instruction 148, resulting from one or more executions of the first software 130.

As further described, the first software 130 can be generated (e.g., programmed) such that it includes one or more "critical points" (upgrade locations). A critical point can be a position in the first software 130 where it is suitable for the first software 130 to be replaced with the second software 170 with mitigated operational risk to the device 125, e.g., minimal, or no, software operations (e.g., read/write operations) are being performed during execution of particular point of code in the first software 130.

A determination can be made (e.g., by a program included in the second memory 178, and executable by the second processor 175, or an external system (not shown)) that control of the device 125 can be switched to the second software 170, thereby enabling control of the industrial process to switch to the second software 170 without having to temporarily cease operation and/or monitoring of the industrial process, e.g., to update the ICS 100 to the second software 170, termed herein "updated control phase". In an embodiment, the switch 173 in the proxy component 150 is switched (e.g., by the update manager component 172) from the dual state operation, where the first controller 110 and the second controller 160 are in communication with the device 125 and each other, to a second single state operation wherein only the second controller 160 is in communication with the device 125. The transition from the control of the device 125 by the first software 130 to the second software 170 can be achieved with minimal downtime, with performance being minimally impacted, if at all.

During the updated control phase, the first software 130 ceases to generate control instructions, with the second software 170 now generating the instruction(s) 180 for application at the device 125, and the second software 170 further continues to receive the operational data 140B. In an embodiment, the first controller 110 (with the first software 130) can be removed from the system 100. In a further embodiment, e.g., at a later time where the second software 170 is to be updated (e.g., due to scheduled upgrade, an identified vulnerability in the second software 170), the first controller 110 can be updated with a third software and the aforementioned initial phase, determination phase, parallel phase, and updated control phase can be repeated to facilitate updating the second software 170 with the third software installed on the first controller 110.

In an embodiment, the respective communications between the first controller 110, the second controller 160, the proxy component 150, and the device 125 can utilize any suitable communication protocol (e.g., internet protocol (IP)) over the network 145. For example, transmission control protocol (TCP or TCP/IP) can be utilized as a communication protocol, wherein TCP facilitates accurate, reliable, ordered, and error-checked data streams. Further, operation of the proxy component 150 is such that the same operational data 140 is provided to both the first software 130 and the second software 170, hence to facilitate understanding the operational data 140 is depicted in FIG. 1 as a first data copy 140A and a second data copy 140B, wherein the first data copy 140A and the second data copy 140B include the same data such that the first software 130 and the second software 170 can both make the same determinations as to a current (or previous) state of the device 125.

Figure 2:
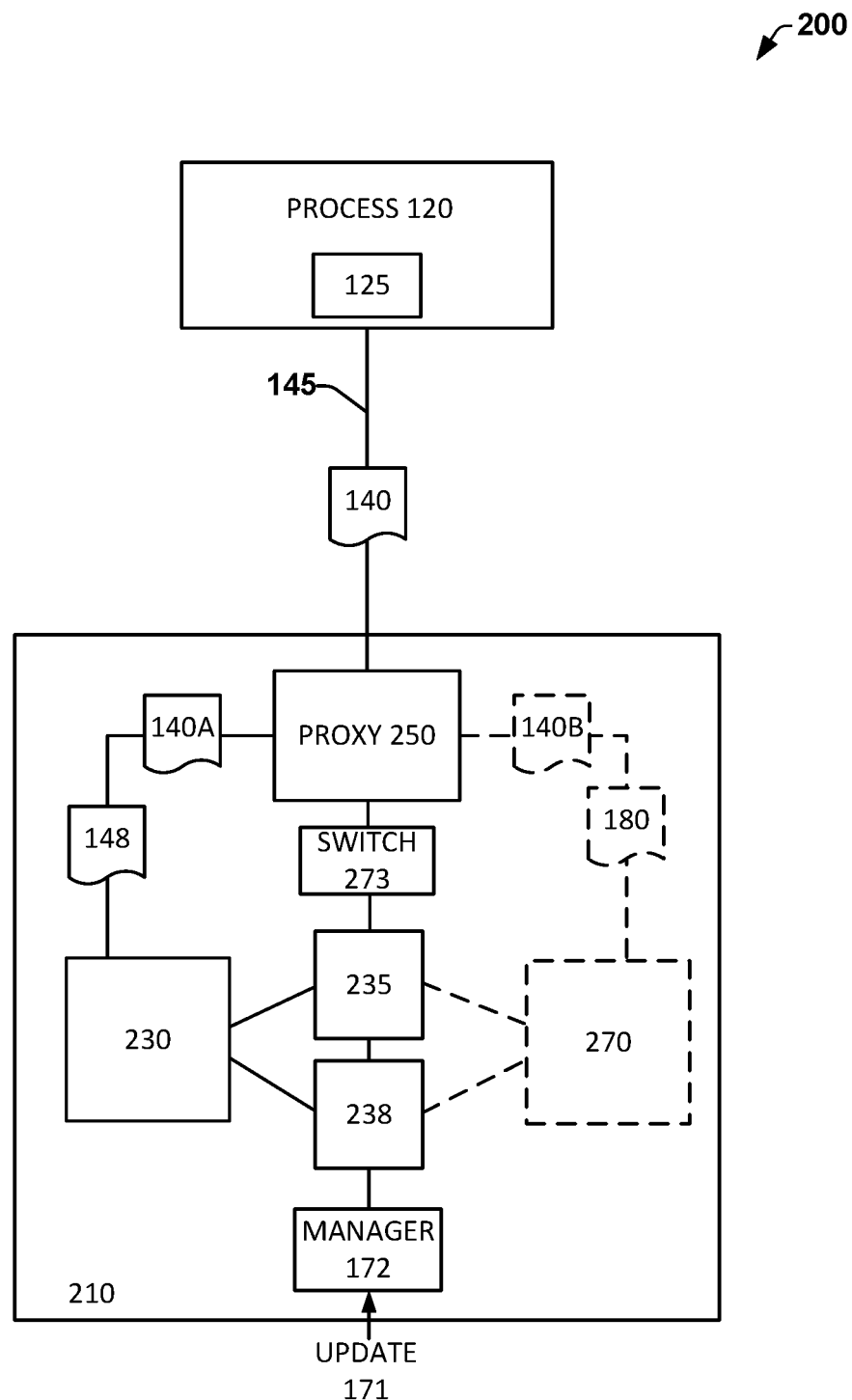
FIG. 2 presents an industrial control system for real-time software updating, according to an embodiment.

Turning to FIG. 2, an ICS 200 is presented, wherein a single controller 210 is in communication with the process 120, and the device 125. While the ICS 100 utilized two controllers 110 and 160, each having respective first software 130 and second software 170 stored thereon, the real-time software upgrade operation can be performed on the single controller 210. During an initial configuration, the single controller 210 can have a first software 230 (e.g., the first software 130) installed thereon (e.g., in a memory 238), wherein the controller 210 can further include a processor 235 configured to execute the first software 230.

In an operation similar to that previously described from implementation of the ICS 100, the various components included in the ICS 200 can undergo a similar sequence of initial phase, determination phase, parallel phase, and updated control phase. During the initial phase the first software 230 can be controlling the device 125, wherein operational data 140 is transmitted from the device 125 to the controller 210, for operation by the first software 230, and further, one or more instructions 148 can be generated by the first software 230 for implementation at the device 125. As previously described, the controller 210 can be communicatively coupled to the device 125 via the network 145. To facilitate sharing of instructions and data within the controller 210, the controller can further include a proxy component 250, wherein the proxy component 250 can operate in a similar manner to the proxy component 150, wherein a switch 273 at the controller 210 is in a first single state of operation such that data and any operational commands are communicated between the first software 230 and the device 125.

As previously described, a determination can be made (e.g., during the determination phase) that the first software 230, or a portion thereof, should be replaced. In view thereof, a second software 270 can be installed on the controller 210 (e.g., in memory 238), wherein the processor 235 can be configured to execute the first software 230 and the second software 270 in parallel.

Subsequent to the second software 270 being installed on the controller 210, a software update signal 171 can be received at the update manager 172 located in the controller 210, to initiate the parallel phase of operation. During the parallel phase of operation, the first software 230 continues to control the device 125 via instructions 148 generated by the first software 230, while the second software 270 receives the copy 140B of the operational data 140 along with any instruction 148 generated by the first software 130. The switch 273 transitions to a dual state of operation such that data and any operational commands are communicated between the first software 230, the second software 270, and the device 125. The mirrored operation of the second software 270 with the first software 230, enables the second software 270 to operate in lock step with the first software 230, such that the first software 230 and the second software 270 have a same level of knowledge regarding operation of the device 125. The parallel phase operation can continue for a duration after which the second software 270 has sufficient knowledge of the operation of the device 125, and further, operation of the process 120, as previously described.

Operation of the controller 210 can transition to the updated control phase, wherein control of the device 125 is switched to the second software 270, thereby enabling control of the industrial process to switch to the newer code in the second software 270 without having to temporarily cease operation and/or monitoring of the industrial process. During the updated control phase the first software 230 ceases to generate any control instructions with second software 270 now generating the instruction(s) 180 for application at the device 125, and the second software 270 further continues to receive the operational data 140B (e.g., the switch 273 switches to a second single state of operation where the second software 270 is only in communication with the device 125). The first software 230 can be removed (e.g., deleted) from the controller 210 such that at a later time where the second software 270 is to be updated (e.g., due to scheduled upgrade, a newly identified vulnerability in the second software 270), the controller 210 can be updated with a third software and the aforementioned initial phase, determination phase, parallel phase, and updated control phase can be repeated to facilitate updating the second software 270 with the third software installed on the controller 210.

While not shown in FIGS. 1 and 2, it is to be appreciated that the various devices and components presented in ICS's 100 and 200 include respective input/output (I/O) components to facilitate transmission of the data 140, 140A, 140B, instructions 148, 180, and/or update signal 171 between the various devices and components to facilitate application of the various embodiments presented herein.

Figure 3:
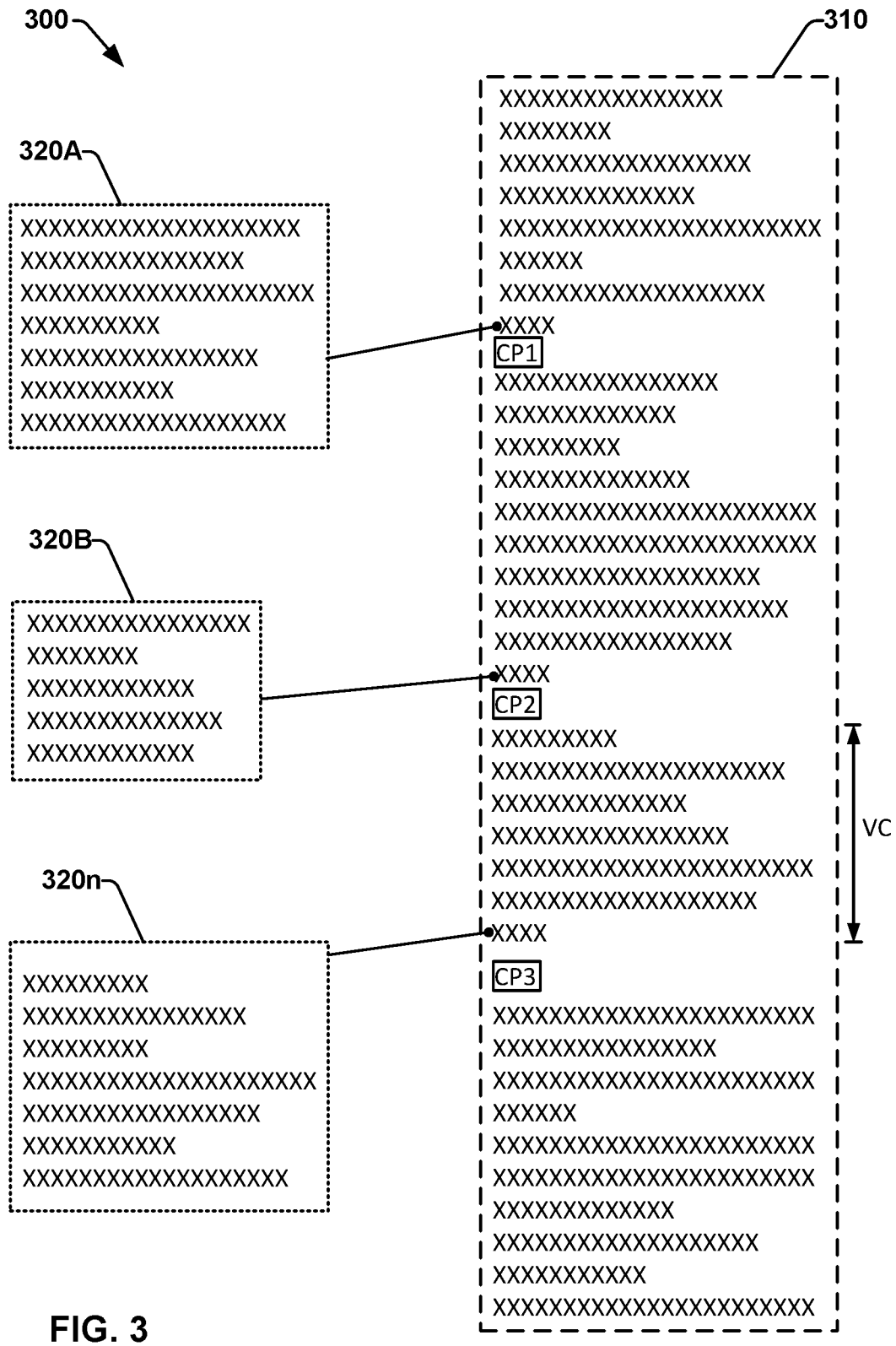
FIG. 3 presents a representation of a control software having critical points identified therein, according to an embodiment.

FIG. 3 presents a schematic 300 of a software program that can be configured to facilitate real-time updating of the software program. The software program 310 can be considered to be any of the first software 130, the second software 170, the first software 230, and/or the second software 270. The software program 310 can comprise of a plurality of lines of software code (e.g., as denoted by the XXXXX's), wherein the main program 310 can further include call outs to various subroutines 320A, 320B, and 320n, where n is a positive integer, such that the software program 310 is a main loop of execution and the subroutines 320A-n are branches which perform other functions while the program 310 manages the overall flow. During writing of the software program 310 (and the subroutines 320A-n), a software developer can incorporate one or more critical points CP1-n into the code, wherein each critical point in the one or more critical points CP1-n can identify when minimal, or no, software operations (e.g., read/write operations) are being performed during execution of code at that particular point of the software program 310. Example locations for placement of critical points CP1-n in the program 310 include at a call out from the main loop code to branch code, where program flow returns to the main loop code in the software program 310, after a branch subroutine 320A-n has completed its execution, etc. Accordingly, any of the critical points CP1-n can be utilized to determine when it is safe to initiate replacement of an initial software (e.g., either of the first software 130 or 230) with an upgrade, or patch, software (e.g., respective second software 170 or 270). Thus, utilizing the critical points CP1-n as described herein does not require managing deep traces of the branch executions in subroutines 320A-n, a software developer only has to note, and store, the critical points CP1-n. In the event of the update signal (e.g., update signal 171) is received to upgrade the initial software when the execution is nested deep within any of the branches 320A-n, the initial software will continue to operate until the execution is brought back into the main loop of the software program 310 and the next acceptable upgrade location (e.g., next critical point in CP1-n) has been reached. As previously mentioned, the critical points CP1-n, or viable upgrade location within the main execution loop 310, can be chosen by the software developer, or automatically, as further described herein. Discretion should be used to avoid initiating upgrades at inconvenient times, such as in the middle of a calculation or within a loop that is non-essential to the overall flow. At each critical point CP1-n, a check is made (e.g., by the update manager component 172) to determine whether an update command (e.g., update signal 171) has been received. In the event of an update command being received, a TCP connection can be established with the new version of the software (e.g., second software 170 or 270, which is running and waiting to receive data), and the state of the original software (including all essential variables necessary for continued execution beyond the critical point) is handed off. The original software terminates and the replacement software jumps to the same critical point CP1-n and continues executing. As a result, the same critical points CP1-n should be chosen in both the first and second versions of the software.

In an embodiment, the second software (e.g., software 170 or 270) can comprise a complete replacement for the first software (e.g., software 130 or 230), or the second software can comprise of patch code to replace a portion of the first software. For example, where the second software is a patch code, a determination has been made that the lines of vulnerable code marked VC include an identified vulnerability, and need to be replaced as soon as possible (e.g., prior to a scheduled downtime for the process 120). Hence, the second software 270 can provide a patch to the first software 230. In an embodiment, the second software 270 may just comprise patch code sufficient to replace the lines of code VC. Alternatively, the second software 270 may comprise all of the code 310, plus subroutines 320A-n, where the code VC is updated in the second software 270, and the entirety of the first software 230 comprising the code 310 and the subroutines 320A-n is replaced. In a further exemplary alternative, one of the subroutines 320A-n in the first software 230 is determined to be vulnerable and the second software 270 is a patch to correct the respective subroutine 320A-n.

To ensure that the updated software (e.g., either of second software 170 or 270) is able to replace the initial software (e.g., either of respective first software 130 or 230) operation of the initial software should be fully understood, e.g., with regard to location information, configuration, any software dependencies, any utilized communication channel(s), application program interface (API) calls, state variables, memory requirements, etc., to facilitate generation of a generalized framework which accommodates the potentially diverse landscape of software implementation and accordingly, can be utilized to create the initial software, the updated software, and any subsequently generated software (e.g., third software), wherein state information of the device 125 obtained by the initial software can be learned by the updated software.

Figure 4:
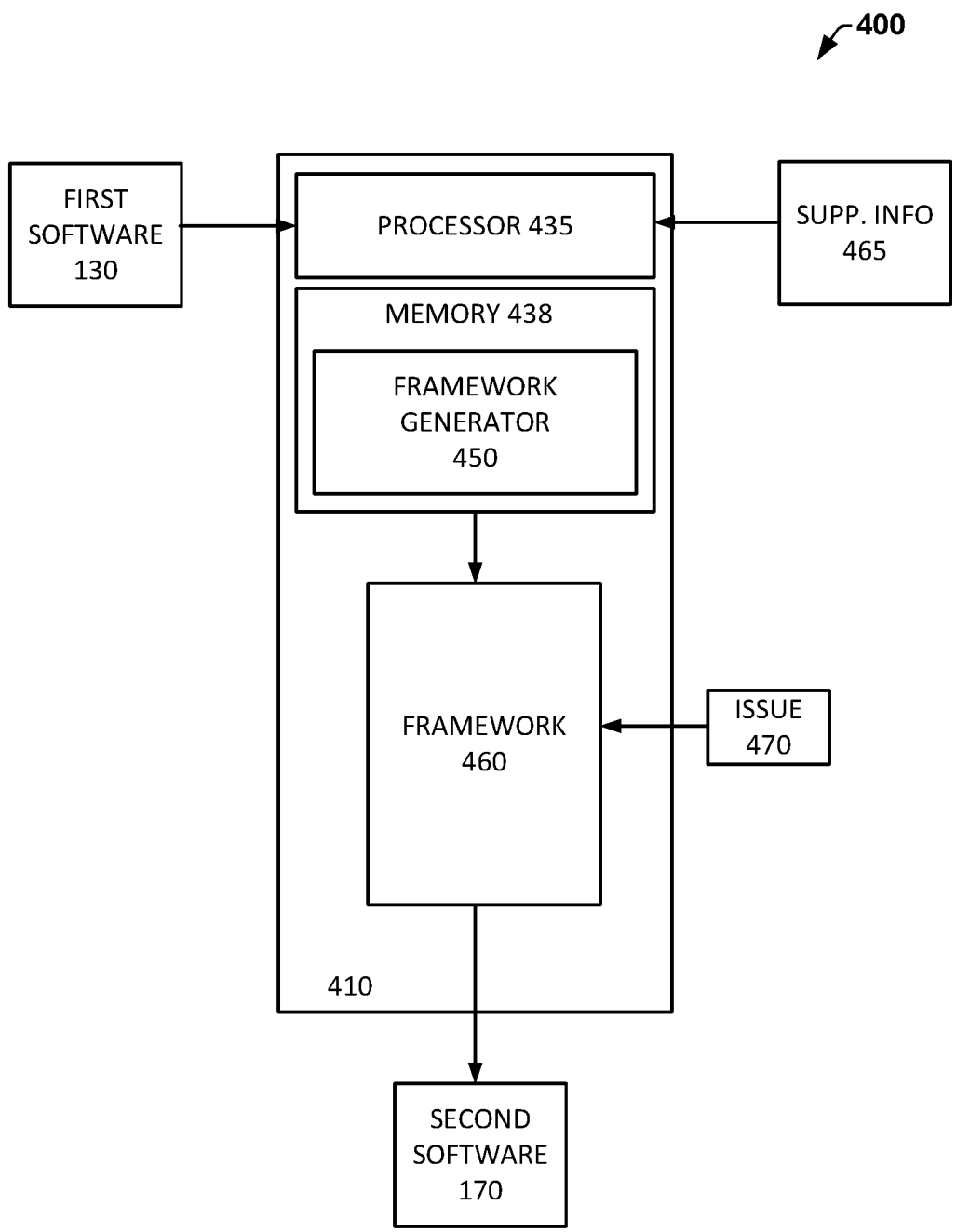
FIG. 4 illustrates a system for generating a framework based upon a software, according to an embodiment.

The foregoing framework and critical point placement can be implemented by an automated system, as shown in FIG. 4, a framework system 400. A computing device 410 can comprise a processor 435 and a memory 438, wherein a framework generator component 450 can be stored in the memory 438, and executed by the processor 435. The framework generator component 450 can be configured to analyze a software program developed to control one or more devices (e.g., device 125) in an industrial process, and based thereon, can generate a framework 460 which accurately depicts the software program. Accordingly, as shown, the first software 130 can be provided to the framework generator component 450, whereupon the framework generator component 450 analyzes the first software 130 and generates a framework 460, based thereon.

During analysis of the first software 130, the framework generator component 450 can be configured to identify and determine such issues as the current depth of execution of the first software 130, processor load, memory utilization and other system specifications. The framework generator component 450 can further identify suitable candidate critical points in the first software 130 where state information can safely be transferred to an upgraded version which is potentially located on a physically separated device, as previously described. In an embodiment, the first software 130 can be in a program class containing a high level main loop that repeats. Accordingly, a high level loop can have a critical point (e.g., CP1, CP2) located at both the beginning and end of each call out to branch code from a high level loop. Given that the industrial process (e.g., process 120) is continuously running, a high level loop will exist within the first software 130 since high availability is a concern for these industrial processes. Hence, the framework generator component 450 facilitates automated identification of critical code in the first software 130 that cannot be interrupted in an application, wherein, for example, such identification can be through the use of a debugger(s) to analyze the first software 130. In an embodiment, a debugger can be configured to monitor register usage and only those points having minimal utilization would be identified as potential critical points (CP), while all other points in execution (e.g., frequently utilized points) would not be included in the set of potential CP's. The debugger can also be configured to review other metrics such as processor load and/or memory utilization to facilitate identification of suitable CP's.

It is to be appreciated that while the framework generator component 450 can generate the framework 460 based upon the first software 160, supplemental information 465 can also be provided to the framework generator component 450 to facilitate generation of a framework 460 that portrays the process 120 to an extent greater than can be achieved by analysis of the first software 160 alone. For example, the supplemental information 465 can include information pertaining to one or more devices in process 120 that are not controlled and/or accessed by the first software 160, but knowledge of the one or more devices enables the framework 460 to be generated with greater scope than could be achieved by analysis of the first software 130 in isolation. The supplemental information 465 can further include one or more specific functions or blocks of code that cannot be interrupted where there is a high I/O requirement(s) and/or a real-time processing constraint(s). In an embodiment, the regions of code, where interruption cannot be afforded, can be provided to a debugger (e.g., operating in the framework generator component 450) upon initialization (e.g., by a user). The debugger can be configured to exclude the uninterruptible points from the selectable CP's. The supplemental information 465 can be generated automatically (e.g., by an external system configured with such information (not shown)), or entered manually by a user (e.g., via an interface communicatively coupled to the computing device 410 (not shown)).

Such an approach enables an issue, software upgrade, etc., to be accurately and securely addressed, as further described. The framework 460 can be generalized to capture any unique state variables within the first software 130.

In a further embodiment, the framework generator component 450 can receive an issue 470, wherein the issue 470 can be, for example, any of a descriptor describing the vulnerability identified for the first software 130, an upgrade to be applied to the first software 130, or a descriptor describing one or more features of a device that is newly added to the process 120. The framework generator component 450 can be configured to apply the received issue 470 to the framework 460, and based thereon, the framework generator component 450 can be further configured to generate the second software 170. Hence, the second software 170 can be generated such that the issue 470 is addressed by differences between the second software 170 relative to the first software 130, the second software 170 functions in accordance with various operations performed by the first software 130, and further, the second software 170 includes appropriately placed critical points CP1-$n$ to facilitate seamless automatic replacement of the first software 130 with the second software 170.

Figure 5:
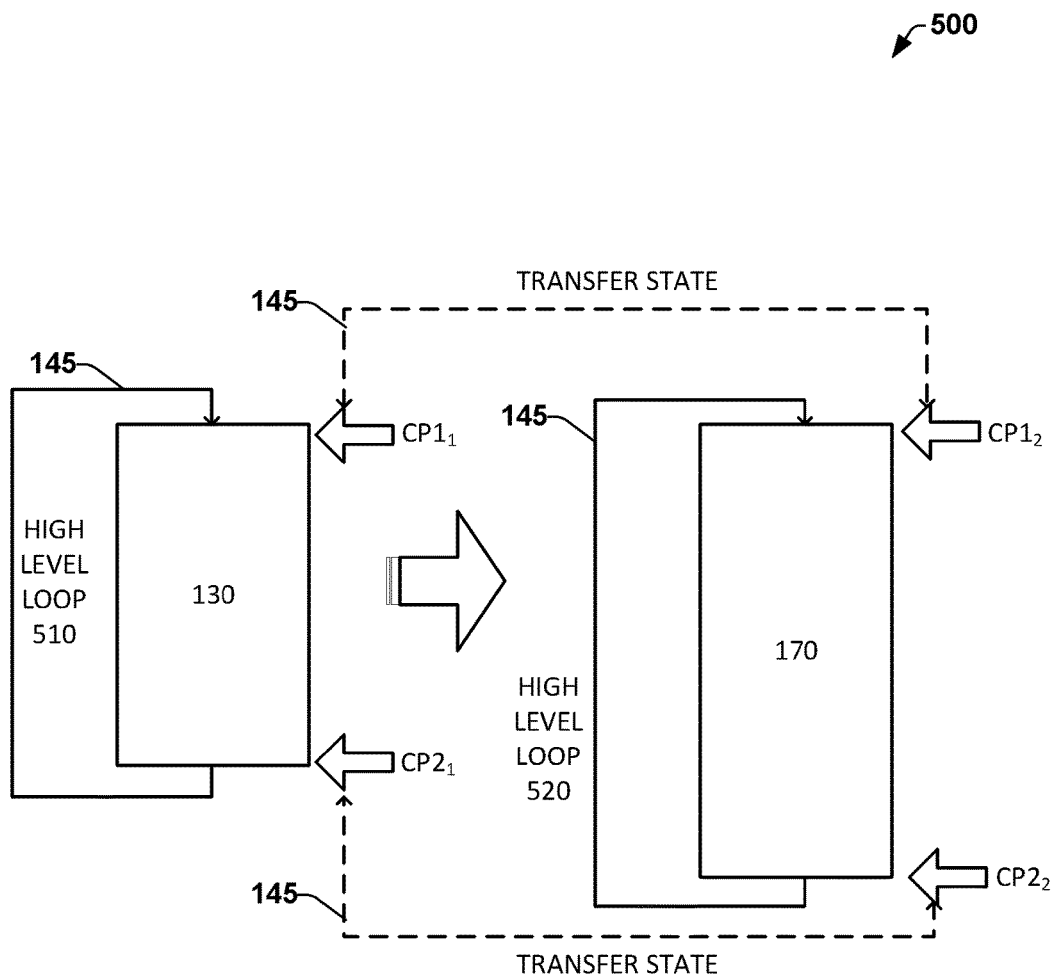
FIG. 5 is a schematic illustrating respective critical points during replacement of a first software with a second software.

FIG. 5, schematic 500, illustrates a high level overview of the first software 130 being replaced by the second software 170. As shown in FIG. 5, the first software 130 is configured to operate with a high level loop 510, while the second software 170 is configured to operate with a high level loop 520. Further, the first software 130 includes first and second critical points, $CP1_1$ and $CP2_1$, while the second software 170 includes third and fourth critical points, $CP1_2$ and $CP2_2$. As previously described, $CP1_1$ and $CP1_2$ are respectively located at comparable points in the respective high level loops 510 and 520, and similarly, $CP2_1$ and $CP2_2$ are also respectively located at comparable points in the respective high level loops 510 and 520. Hence, when the first software 130 is replaced with the second software 170, the critical points $CP1_2$ and $CP2_2$ in the second software 170 mirror the critical points $CP1_1$ and $CP2_1$ in the first software 130, enabling direct replacement of the first software 130 with the second software 170.

Figure 6:
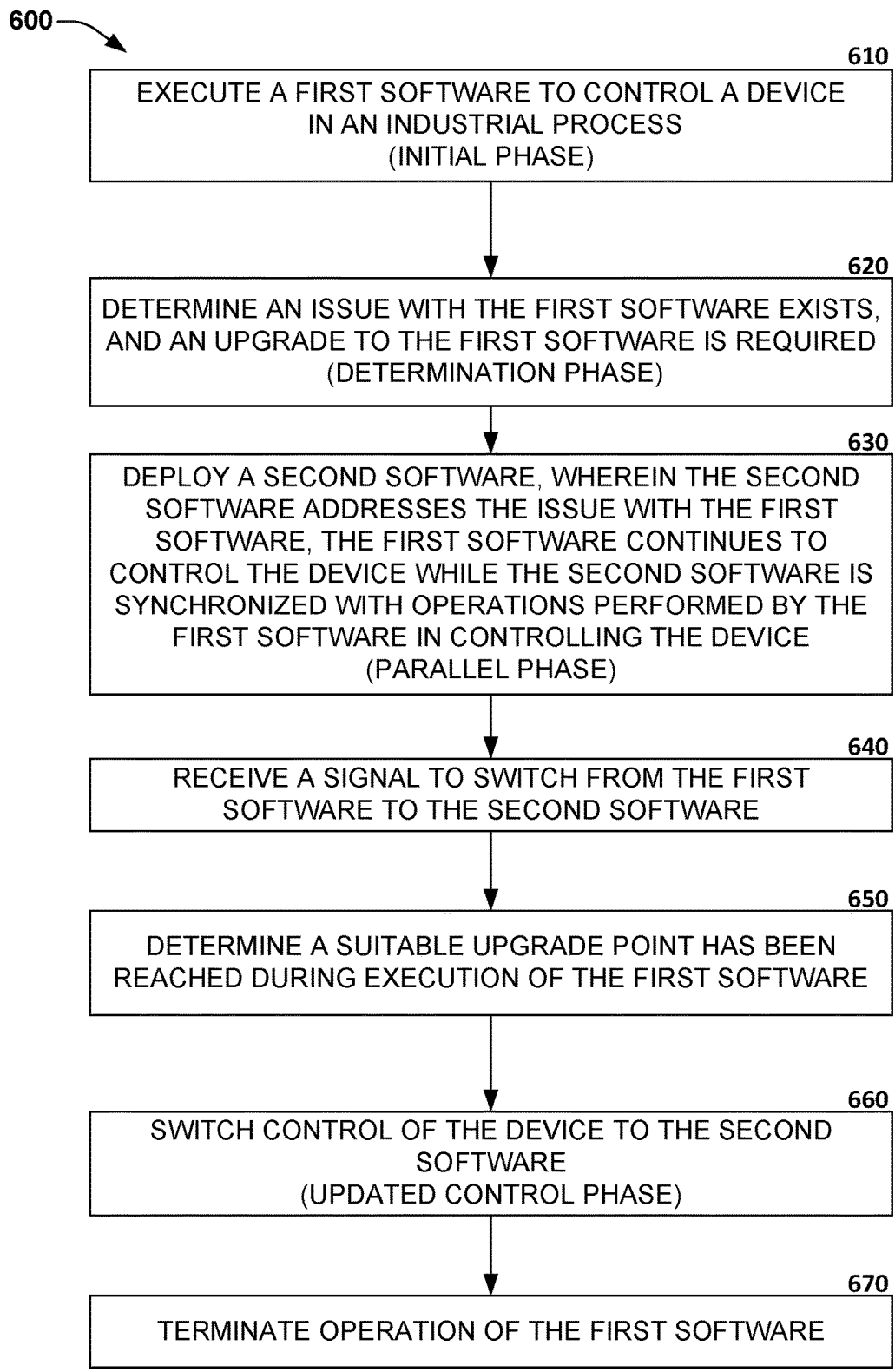
FIG. 6 is a flow diagram illustrating an exemplary methodology for replacing a software controlling a device while the device can remain in operation.
Figure 7:
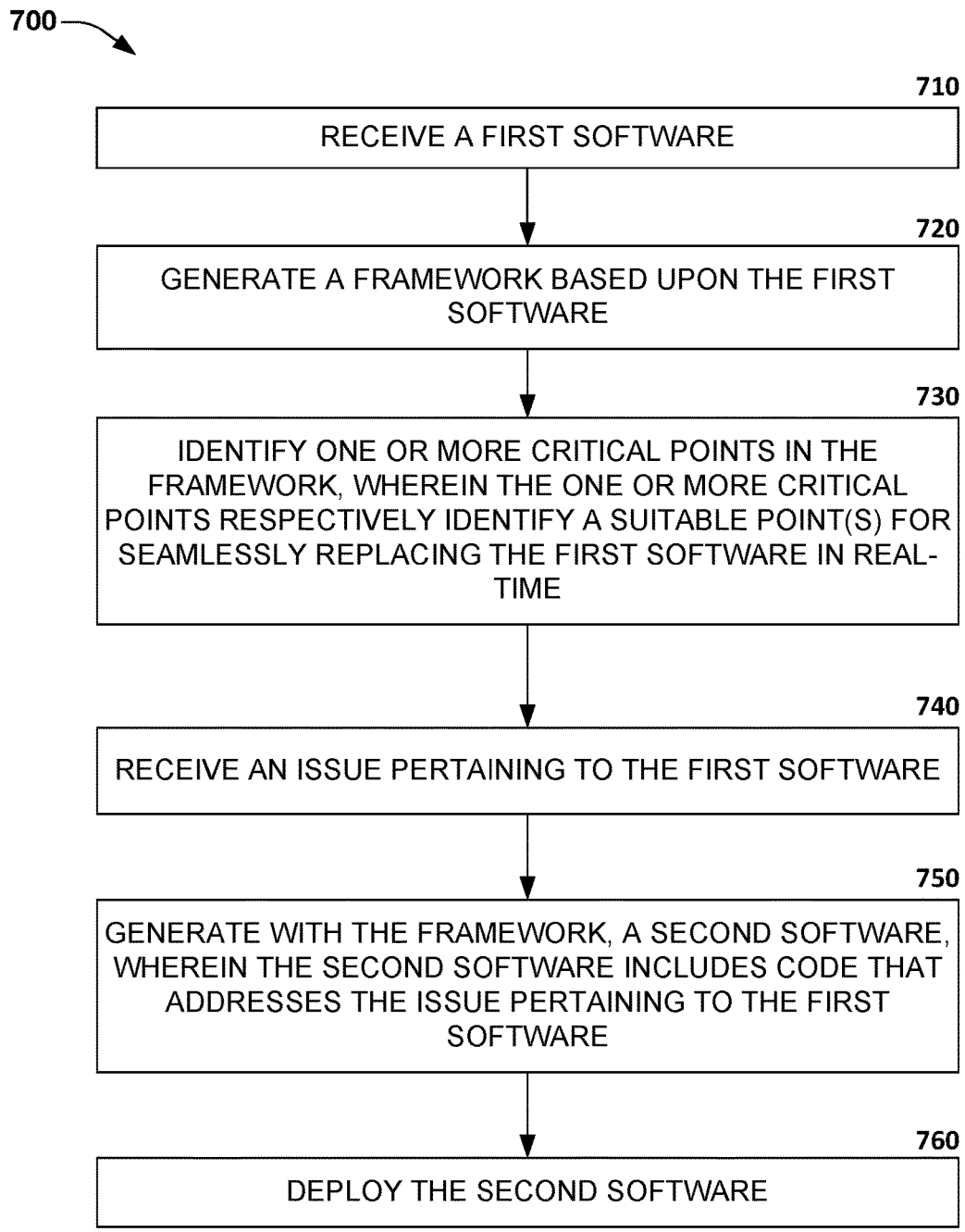
FIG. 7 is a flow diagram illustrating an exemplary methodology for generating a framework that describes one or more operations performed by an industrial control software.

FIGS. 6 and 7 are methodologies relating to updating and/or patching a software program on an industrial controller in real-time, wherein the industrial device and/or process being monitored by the industrial controller does not have to be taken offline while the update is occurring. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 6 presents a methodology 600 for updating a first software with a second software, wherein the first software is being utilized to monitor a device and/or process, the update is performed in real-time without the device and/or process having to be taken offline while the update is performed. At 610 (initial phase), a first software is executed on an industrial controller, wherein the first software is being utilized to control and/or monitor operation of a device included in an industrial process. In an embodiment, the controller can be communicatively coupled to the device via a network. In another embodiment, a proxy component can be located in the controller in readiness for a software update to occur, or in a further embodiment, the proxy component can be located on the network between the controller (having the first software operating thereon) and the device, wherein the proxy component can also communicate with a second controller, as previously described.

At 620 (determination phase), a determination can be made that the first software is to be replaced, either in its entirety or partially. As previously described, the determination can be based upon a new version of software is available to replace the first software (e.g., as part of a system upgrade), a vulnerability has been identified for the first software, etc. Rather than waiting for a scheduled downtime for the process, it is determined that the first software should be updated and/or patch as soon as possible, e.g., sooner than the scheduled downtime. However, the process is a high availability process and hence cannot be taken offline, accordingly the first software is to be replaced without the process being taken offline. Based upon the requirement for the first software to be replaced, a new, second software can be generated to address the requirement.

At 630 (parallel phase), the second software can be deployed in readiness to replace the first software. As previously described, during the parallel phase, the first software continues to control the device, while the second software is synchronized to the first software. In an embodiment where the first software and the second software are co-located on the same controller, the proxy component located in the controller can be utilized to ensure that operational data from the device (and the process) is received at both the first software and the second software, and further, any commands generated by the first software to control the device during the parallel phase are also received at the second software, hence the first software and the second software are synchronized with regard to state of the device, software state, etc., such that the first software and the second software are operating in lockstep.

At 640, a signal can be received (e.g., at an update manager component) instructing the system to switch from the first software controlling the device to the second software controlling the device.

At 650, in response to the received signal, a determination is made (e.g., by the update manager component) that the parallel phase of operation has been of a duration such that the second software has sufficient knowledge of operation of the device (and the process) and the second software is in a state amendable to taking over control from the first software. A further determination (e.g., by the update manager component) is made that a suitable point (critical point CP1-$n$) has been reached in the first software for transition to the second software, and the first software can terminate. As previously described, the critical point(s) can be defined in the first software during its creation (or subsequently), wherein, in an example, a critical point can be at a transition between main loop code in the first software and branch code in the first software.

At 660 (updated control phase), in the event of the critical point being identified, control of the device can be handed to the second software.

At 670, with the second software controlling the device, operation of the first software can be terminated. In an embodiment where the first software is operating on a separate controller to the second software, the controller having the first software located thereon can be removed from the system, the first software deleted in readiness for the controller to be reprogrammed with a subsequent software (third software) to be utilized to replace the second software at some later point in time. In an embodiment where the first software and the second software are located on the same controller, the first software can be erased from the controller in readiness for a third software to be installed thereon at a time when the second software is to be updated.

It is to be appreciated that while the methodology 600 illustrates a single instance of an original software (first software) being replaced with a newer version (second software), the flow can return to the beginning (e.g., act 670→act 610) when the second software is to be updated by a subsequent version (e.g., a third software).

FIG. 7 presents a methodology 700 for generating a framework that depicts an operation(s) performed by a first software, wherein the framework is subsequently utilized to generate an updated version (second software) of the first software.

At 710, a first software (e.g., a first version of a software) can be received (e.g., at a framework generator component). As previously described, the first software can comprise of main loop code and branch code.

At 720, the first software can be analyzed, and based thereon, a framework representing the various operations performed by the first software can be generated (e.g., by the framework generator component operating in conjunction with a processor). As well as the framework being constructed based upon the code in the first software, supplemental information pertaining to the device and/or the process in which the device operates, can be provided during construction of the framework. The supplemental information enables the framework to describe one or more elements pertaining to the device and/or process that might not be utilized in the first software, but may be of interest when the framework is utilized to generate an upgrade software based upon the first software.

At 730, one or more critical points can be identified in the framework, wherein the one or more critical points identify a suitable moment during execution of the first software when transitioning to the second software can occur. In an embodiment, the first software can comprise of main loop code and one or more instances of branch code. A critical point can be placed at a time of low processor activity, e.g., at a point just prior to initiating a branch code call, at a point of a branch code returning to the main loop code, etc. In an embodiment, the one or more critical points can be defined manually by a software developer. In another embodiment, the one or more critical points can be automatically identified by the framework generator component, e.g., where such identification is based upon predefined criteria such as low to minimal code and/or data processing, a call from main loop code to branch code, a return from branch code to the main loop code, etc.

At 740, an issue pertaining to the first software can be received. For example, the issue can be a newly identified vulnerability affecting the first software, a new device is to be added to the process and the device being controlled by the first software is to operate in conjunction with the new device, a device in the process has become obsolete and is to be replaced, etc. The issue can be applied to the framework.

At 750, a second software can be generated from the framework, wherein the second software includes code to address the issue (e.g., identified in act 740).

At 760, the second software can be deployed in readiness for the second software to assume control of a device in an industrial process that is currently being controlled by the first software, as described in the methodology 500. As previously described, the second software can be installed on a second controller that is added to a network which already includes a first controller having the first software installed thereon. In another embodiment, the second software can be installed on a controller that has the first software installed thereon and is already operational in controlling the device.

Further, while the various embodiments presented herein relate to a first system (FIG. 1, system 100) comprising the first software being installed on a first controller and the second software being installed on a second controller, or a second system (FIG. 2, ICS 200) comprising the first software and the second software being installed on the same controller, it is to be appreciated that any suitable approach can be utilized to facilitate controlling a device with a first software and replacing the first software with a second software without having to take the device offline. For example, the second software can be installed on a remote device (e.g., a remote computer) that is in communication with the controller having the first software installed thereon, and the remote device interfaces with the controller to facilitate control of the device even though the second software is not installed on the controller.

The various embodiments presented herein are applicable to any software or code that is utilized in an ICS environment, e.g., configured for execution on a controller. Such software or code can include generic software (e.g., C programming language), open source software (e.g., MODBUS, LIBMODBUS), proprietary software (e.g., as utilized by ALLEN BRADLEY, ROCKWELL AUTOMATION, SIEMENS), or a combination thereof.

Further, the various embodiments are applicable to addressing any vulnerability to which a software might be exposed, which, in a non-limiting list can include a buffer overload attack, code injection, privilege escalation, structured query language (SQL) injection, etc.

Figure 8:
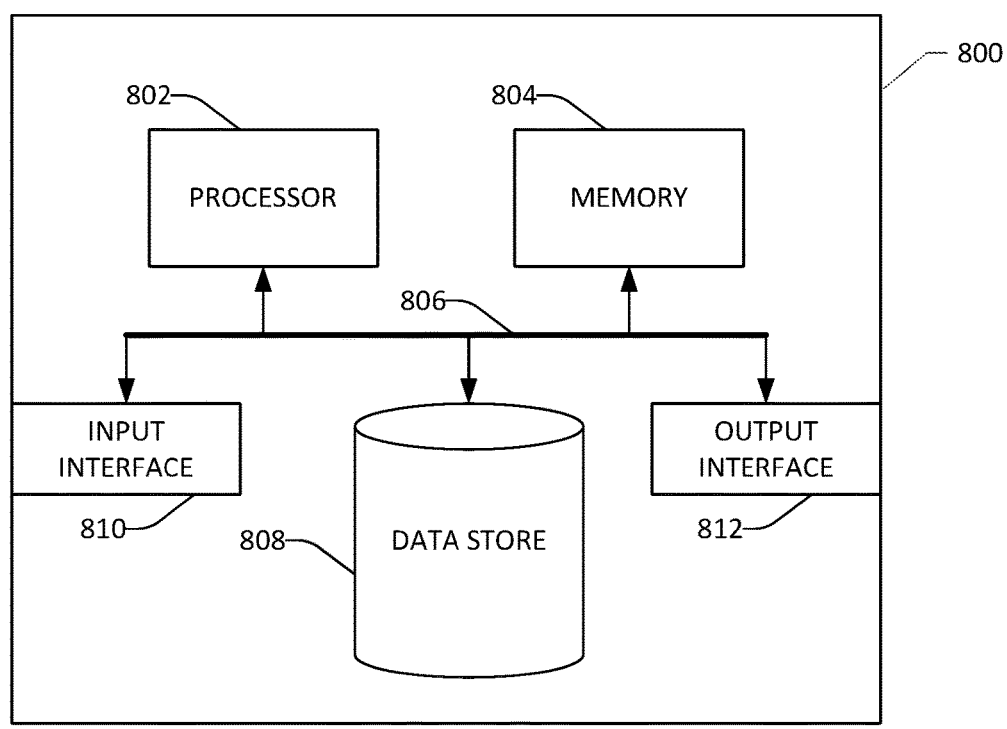
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be utilized in an industrial control system configured to replace a first software with a second software while a device being controlled by the first software remains online. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store operating parameters, required operating parameters, and so forth.

The computing device 800 additionally includes a data store 808 that is accessible by the processor 802 by way of the system bus 806. The data store 808 may include executable instructions, operating parameters, required operating parameters, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method for controlling a device in an industrial process, the method comprising:
    executing a first software on a first controller, the first software configured to control operation of the device, wherein the first software receives operational data from the device during execution of the first software;
    receiving an instruction to control operation of the device with a second software rather than the first software;
    executing the second software on a second controller different from the first controller, the second controller executes the second software concurrently with the first controller executing the first software, wherein the second software receives the operational data and control data generated by the first software from a proxy component located on a network that connects the first controller and the second controller to the device, wherein the second software receives the operational data as the first software continues to control operation of the device, and further wherein the proxy component receives the operational data from one of the device or the first software and the proxy component receives the control data from the first software;
    determining a predefined critical point has been reached in the first software;
    based upon determining the critical point has been reached, switching control of the device from the first software to the second software while the device continues to operate; and
    terminating operation of the first software while the second software controls the device.

2. The method of claim 1, wherein at least one of the first controller or the second controller is one of a programmable logic controller, a programmable automation controller, a remote terminal unit, an intelligent electrical device, a human machine interface, or a personal computer.

3. The method of claim 1, wherein the first software comprises main loop code and branch code, and the critical point is located at one of a call from the main loop code to the branch code or a return from the branch code to the main loop code.

4. An industrial control system comprising:
    a first hardware controller configured to execute a first software, wherein the first software is configured to control a device included in an industrial process based upon operational data received from the device;
    a second hardware controller configured to execute a second software, wherein the second software is a partial clone of the first software; and
    an upgrade manager software component configured to:
        receive an update signal, wherein the update signal indicates the second software is to take over control of the device from the first software;
        in response to receiving the update signal, initiate concurrent operation of the second software and the first software, wherein during the concurrent operation of the first software and the second software, the first software continues to control the device and the second software receives the operational data and control data generated by the first software in connection with controlling operation of the device, wherein the second software receives the operational data and control data from a proxy component located on a network connecting the first controller and the second controller to the device, wherein the proxy component receives the operational data from one of the device or the first software, and further wherein the proxy component receives the control data from the first software; and switch control of the device from the first software to the second software while the device continues to operate.

5. The industrial control system of claim 4, wherein at least one of the first hardware controller or the second hardware controller is one of a programmable logic controller, a programmable automation controller, a remote terminal unit, an intelligent electrical device, a human machine interface, or a personal computer.

6. The industrial control system of claim 4, wherein the first software comprises main loop code and branch code, and a critical point located at either a call out from the main loop code to the branch code or a return from the branch code to the main loop code.

7. The industrial control system of claim 6, wherein the upgrade manager software component is further configured to:

detect the critical point in the first software; and
upon detecting the critical point, initiate the switching of control of the device from the first software to the second software.

8. The industrial control system of claim 4, wherein during the concurrent operation of the second software and the first software, the second software gains knowledge of the device from the operational data received and the control data generated by the first software.

9. The industrial control system of claim 4, wherein the operational data and the control data are communicated according to transmission control protocol.

10. An industrial controller comprising a non-transitory computer-readable storage medium comprising instructions that, when executed by a processor of the industrial controller, cause the processor to perform acts comprising:

executing a first software on a first controller, wherein the first software is configured to process operational data received from a device included in an industrial process such that the first software controls operation of the device;

receiving an instruction to switch control of the process from the first software to a second software, wherein the second software is a partial clone of the first software;

executing the second software on a second controller such that the second software is executing in parallel with the first software, wherein during the parallel execution the operational data is received at both the first software and the second software from a proxy component located on a network that connects the first controller and the second controller to the device, and during the parallel execution the first software continues to control the device, wherein the proxy component receives the operational data from one of the device or the first software, and further wherein the proxy component receives the control data from the first software;

switching control of operation of the device from the first software to the second software while the device continues to operate; and terminating operation of the first software with the second software controlling the device.

11. The industrial controller of claim 10, the acts further comprising:

during the parallel execution of the first software and the second software, detecting a critical point in the first software; and initiating the switching the control of operation from the first software to the second software to occur at the critical point.

12. The industrial controller of claim 10, wherein the second software is developed based upon a framework generated from the first software.

* * * * *